United States Patent
Better et al.

(10) Patent No.: US 10,028,247 B2
(45) Date of Patent: Jul. 17, 2018

(54) MANAGING OF PAGING OF A WIRELESS DEVICE IN A WIRELESS COMMUNICATION NETWORK

(71) Applicant: Telefonaktiebolaget LM Ericsson (publ), Stockholm (SE)

(72) Inventors: David Better, Täby (SE); Walter Müller, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/029,179

(22) PCT Filed: Oct. 9, 2014

(86) PCT No.: PCT/SE2014/051193
§ 371 (c)(1),
(2) Date: Apr. 13, 2016

(87) PCT Pub. No.: WO2015/057134
PCT Pub. Date: Apr. 23, 2015

(65) Prior Publication Data
US 2016/0262129 A1      Sep. 8, 2016

Related U.S. Application Data

(60) Provisional application No. 61/891,481, filed on Oct. 16, 2013.

(51) Int. Cl.
*H04W 4/08* (2009.01)
*H04W 68/00* (2009.01)
(Continued)

(52) U.S. Cl.
CPC ......... *H04W 68/005* (2013.01); *H04W 52/38* (2013.01); *H04W 68/02* (2013.01); *H04W 68/08* (2013.01)

(58) Field of Classification Search
CPC ........... H04W 72/042; H04W 72/0446; H04W 72/06; H04W 68/005; H04W 68/02;
(Continued)

(56) References Cited

U.S. PATENT DOCUMENTS 5,826,173 A   10/1998  Dent
5,918,174 A    6/1999  Chennakeshu et al.
(Continued)

FOREIGN PATENT DOCUMENTS

EP    1874070 A1    1/2008
EP    2146513 A1    1/2010

OTHER PUBLICATIONS

3GPP, "3rd Generation Partnership Project; Technical Specification Group Core Network and Terminals; Non-Access-Stratum (NAS) protocol for Evolved Packet System (EPS); Stage 3 (Release 11)", 3GPP TS 24.301 V11.6.0, Mar. 2013, 1-345.
(Continued)

*Primary Examiner* — Phuoc H Doan
(74) *Attorney, Agent, or Firm* — Murphy, Bilak & Homiller, PLLC

(57) ABSTRACT

Managing of paging of a wireless device (120). A first network node of a wireless communication network (100) determines (203; 301) a code rate and/or transmit power for a present paging message based on a location in a sequence of paging messages. The location is associated with the present paging message. The first network node transmits (204; 302) the present paging message targeted for receipt by the wireless device (120). The present paging message commands the wireless device (120) to connect, or at least initiate connection, to the wireless communication network (100). The present paging message is being coded based on the determined code rate and/or being transmitted based on the determined transmit power.

38 Claims, 4 Drawing Sheets

(51) Int. Cl.
*H04W 68/02* (2009.01)
*H04W 52/38* (2009.01)
*H04W 68/08* (2009.01)

(58) Field of Classification Search
CPC . H04W 52/38; H04W 72/0453; H04W 24/10; H04B 7/0486
USPC ..... 455/435.2, 423, 453, 450, 458; 370/328, 370/350
See application file for complete search history.

(56) References Cited

U.S. PATENT DOCUMENTS

| | | | |
|---|---|---|---|
| 2005/0277429 A1 | 12/2005 | Laroia et al. | |
| 2009/0280823 A1* | 11/2009 | Petrovic | H04W 68/02 455/453 |
| 2010/0331030 A1* | 12/2010 | Nory | H04L 5/0053 455/509 |
| 2013/0195100 A1* | 8/2013 | Baker | H04L 5/0094 370/350 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 8)", 3GPP TS 36.213 V8.8.0, Sep. 2009, 1-77.

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.9.0, Sep. 2014, 1-356.

3GPP, "3rd Generation Partnership Project; Technical Specification Group Radio Access Network; Evolved Universal Terrestrial Radio Access Network (E-UTRAN); S1 Application Protocol (S1AP) (Release 10)", 3GPP TS 36.413 V10.6.0, Jun. 2012, 1-255.

3GPP, "3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.6.0, Dec. 2013, 1-274.

3GPP, "3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.5.0, Sep. 2013, 1-274.

3GPP, "LTE; Evolved Universal Terrestrial Radio Access (E-UTRA); User Equipment (UE) procedures in idle mode (3GPP TS 36.304 version 11.6.0 Release 11)", ETSI TS 136 304 V11.6.0 (Jan. 2014) Jan. 2014, 1-36.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.7.0, Sep. 2013, 1-209.

* cited by examiner

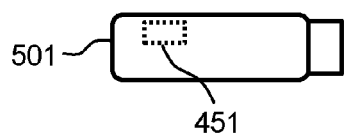
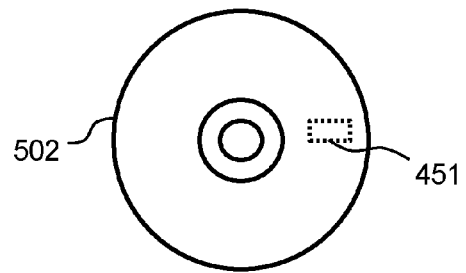
Fig. 5a    Fig. 5b
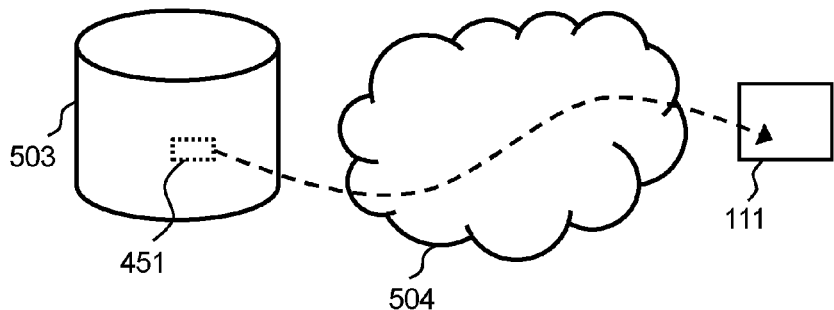
Fig. 5c
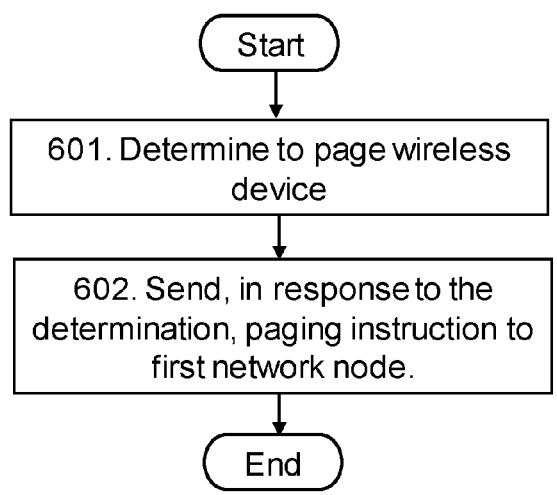
Fig. 6

MANAGING OF PAGING OF A WIRELESS DEVICE IN A WIRELESS COMMUNICATION NETWORK

TECHNICAL FIELD

Embodiments herein relate to methods and network nodes in a wireless communication network, e.g. telecommunication network, and to managing of paging of a wireless device in the wireless communication network.

BACKGROUND

Communication devices such as wireless devices may also be known as e.g. user equipments (UEs), mobile terminals, wireless terminals and/or mobile stations. A wireless device is enabled to communicate wirelessly in a cellular communication network, wireless communication system, or radio communication system, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. The wireless device may be, for example, portable, pocket-storable, hand-held, computer-comprised, or vehicle-mounted mobile device, enabled to communicate voice and/or data, via the RAN, with another entity, such as another wireless device or a server.

The cellular communication network covers a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. Cells may overlap so that several cells cover the same geographical area. By the base station serving a cell is meant that the radio coverage is provided such that one or more wireless devices located in the geographical area where the radio coverage is provided may be served by the base station. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Special Mobile).

In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Moreover, the 3GPP has undertaken to evolve further the UTRAN and GSM based radio access network technologies, for example into evolved UTRAN (E-UTRAN) used in LTE.

The expression downlink (DL) is used for the transmission path from the base station to the wireless device. The expression uplink (UL) is used for the transmission path in the opposite direction i.e. from the wireless device to the base station.

In LTE-based wireless communication systems, a downlink Paging Control Channel (PCCH) may be used to transmit paging information via one or more eNBs serving one or more cells in which the UEs may be located. Paging may e.g. be used to notify UEs of changes in System Information (SI) which will require a reacquisition of SI. The paging channel may also be used to notify the UEs of the presence of Earthquake and Tsunami Warning System (EWTS) information. The paging channel may be used to communicate with a UE when the wireless communication system does not know the exact location and/or cell of the UE and/or when the UE e.g. is in idle mode. In idle mode the UEs may use Discontinuous Receive (DRx) to e.g. reduce battery life. DRX may be configured via parameters to monitor the Physical Downlink Control Channel (PD-CCH) channel at regular intervals, set by DRx parameters, in order to check for the presence of a paging message. If the PDCCH indicates that a paging message is transmitted in a subframe the UE may demodulate a paging channel (PCH) to see if there is a paging message directed to it.

Further, paging messages may be sent to all or a subset of eNBs in a Tracking Area (TA) and/or in TAs that are entered in a TA list. These paging messages may e.g be sent from or via a Mobility Management Entity (MME) and may be termed S1 Application Protocol (S1-AP) paging messages. In response to receipt of such paging message, or separate therefrom, an eNB may transmit another paging message, that may be termed Radio Resource Control (RRC) paging message. This paging message will thus be transmitted in a cell that the eNB serves and in which one or many UEs targeted by the RRC paging message may be located.

In short, in LTE, a paging, or page, procedure may be used by the core network to trigger a UE to connect to the network and thus become available to take a call or receive data. For this purpose an S1-AP paging message may be sent from the MME to an eNB. The eNB in turn uses the information in the S1-AP message to create a Radio Resource Control (RRC) paging message, which is transmitted in one or more cells served by the eNB.

Paging in LTE is e.g. described in:

3GPP TS 36.304 that describes a UE procedure for paging reception, see e.g. v.11.6.9, chapter 7.

3GPP TS 36.331 that describes the RRC part of the paging message, see e.g. v.11.9.0, chapter 6.2.2. 3GPP TS 36.413 that describes the S1-AP procedure and message, see e.g. v.11.6.0, chapter 8.5 and 9.1.6.

In general, paging in a wireless communication network is about a functionality that enables the network to trigger a wireless device to connect to the wireless communication network when the wireless device is in an idle or sleep mode.

For some DL transmissions in LTE, e.g. in the case of transmitting paging messages to UEs, it is hard to estimate the corresponding DL channel as an eNB may have no idea if the UE is located in a cell that the eNB serves, or if it is not. Basically, nothing may be known about the link conditions between the eNB and UE. Yet the paging message should be sent to the UE. In order to maximize or at least increase the chance for the paging message to reach the UE successfully, the eNB may assume that the UE is located in a spot with very poor coverage, i.e. that the UE experiences a very poor channel. This is a robust solution, but wastes radio resources since this situation is typically not the case for most UEs.

With existing solutions for LTE, there is no way for the eNB to know about link conditions to the UE. Thus, a very robust coding and/or high transmit power may be used in order to guarantee that also UEs at the cell-edge are reached. If a less robust coding and/or lower transmit power instead was chosen, then such UEs would effectively be in a coverage-hole and not reachable by the wireless communication system.

A problem with this approach is that, in many cases, a too robust coding is chosen. In many cases the UEs are not at the cell-edge, but rather experience medium or even good radio conditions. When such UEs receive a page it is clear that resources are wasted, primarily PDCCH and Physical Downlink Shared Channel (PDSCH) resources.

SUMMARY

An object is to provide improvements with regard to paging of a wireless device in a wireless communication system, in particular an LTE-based wireless communication network. For example, embodiments herein aim at enabling the paging procedure in LTE to become less wasteful of radio-resources without sacrificing the end-user experience.

According to a first aspect of embodiments herein, the object is achieved by a method, performed by a first network node of a wireless communication network, for managing of paging of a wireless device. The first network node determines a code rate and/or transmit power for a present paging message based on a location in a sequence of paging messages. The location is associated with the present paging message. The first network node transmits the present paging message targeted for receipt by the wireless device. The present paging message commands the wireless device to connect, or at least initiate connection, to the wireless communication network. The present paging message is being coded based on the determined code rate and/or being transmitted based on the determined transmit power.

According to a second aspect of embodiments herein, the object is achieved by a computer program comprising computer program code that when executed by one or more processors causes the first network node to perform the method according to the first aspect.

According to a third aspect of embodiments herein, the object is achieved by a computer program product comprising a data carrier carrying the computer program according to the third aspect.

According to a fourth aspect of embodiments herein, the object is achieved by a method, performed by a second network node of a wireless communication network, for managing of paging of a wireless device. The second network node determines to page the wireless device and sends, in response to the determination, a paging instruction to a first network node of the wireless communication network. The paging instruction commands the first network node to: Determine a code rate and/or transmit power for a present paging message based on a location in a sequence of paging messages, which location is associated with the present paging message. Transmit the present paging message targeted for receipt by the wireless device, which present paging message commands the wireless device to connect, or at least initiate connection, to the wireless communication network. The present paging message being coded based on the determined code rate and/or being transmitted based on the determined transmit power.

According to a fifth aspect of embodiments herein, the object is achieved by a computer program comprising computer program code that when executed by one or more processors causes the second network node to perform the method according to the fourth aspect.

According to a sixth aspect of embodiments herein, the object is achieved by a computer program product comprising a data carrier carrying the computer program according to the fifth aspect.

According to a seventh aspect of embodiments herein, the object is achieved by a first network node for managing of paging of a wireless device, which first network node is comprised in a wireless communication network. The first network node is configured to determine a code rate and/or transmit power for a present paging message based on a location in a sequence of paging messages. The location is associated with the present paging message. Further, the first network node is configured to transmit the present paging message targeted for receipt by the wireless device. The present paging message commands the wireless device to connect, or at least initiate connection, to the wireless communication network. The present paging message is coded based on the determined code rate and/or is transmitted based on the determined transmit power.

According to an eight aspect of embodiments herein, the object is achieved by a second network node for managing of paging of a wireless device, which second network node is comprised in a wireless communication network. The second network node is configured to determine to page the wireless device and to send, in response to the determination, a paging instruction to a first network node of the wireless communication network. The paging instruction commands the first network node to: Determine a code rate and/or transmit power for a present paging message based on a location in a sequence of paging messages, which location is associated with the present paging message. Transmit the present paging message targeted for receipt by the wireless device, which present paging message commands the wireless device to connect, or at least initiate connection, to the wireless communication network. The present paging message being coded based on the determined code rate and/or being transmitted based on the determined transmit power.

In many cases a wireless device may detect the paging at the first attempt even if an initial or first paging message of a sequence is not sufficiently robust, e.g. not coded hard enough, and/or transmitted with sufficient transmit power, to e.g. reach a cell-edge. However, only a small amount of wireless devices typically experience cell-edge like conditions. Hence, a lot of physical resources, such as radio resources, resource blocks and the like, may be saved, i.e. available for use by other functions than the paging procedure, by not assuming that all wireless devices have cell-edge conditions when e.g. determining the code-rate for the initial or first paging message(s) in the sequence. Thanks to embodiments herein and the code rate and/or transmit power determined based on a location in a sequence of paging messages, any remaining wireless devices, i.e. that may has not detected the paging, e.g. the wireless device mentioned above, may instead be successfully paged by subsequent paging messages in the sequence, e.g. using more robust code-rates and/or transmit power. Embodiments herein may result in paging messages being transmitted in a distributed manner in a cell with increased robustness in each transmission of the paging messages in the sequence. The increased robustness, and spending of resources for accomplishing this may mainly concern wireless devices that may require this. Even though more re-transmissions may be required than else would be the case for some wireless devices, in total resources may still be saved and embodiments herein thus enable less waste of resources than else would be the case. Hence, embodiments herein enable that some resources, that would be used and occupied by a conventional paging procedure, need not be occupied, and instead may be available for other use.

BRIEF DESCRIPTION OF THE DRAWINGS

Examples of embodiments herein are described in more detail with reference to the appended schematic drawings in which:

FIGS. 5a-c are schematic drawings illustrating embodiments relating to a computer program product and computer program to cause the first network node to perform method actions.

FIG. 6 is a flowchart schematically illustrating embodiments of a method performed in a second network node of the wireless communication network.

DETAILED DESCRIPTION

Figure 1:
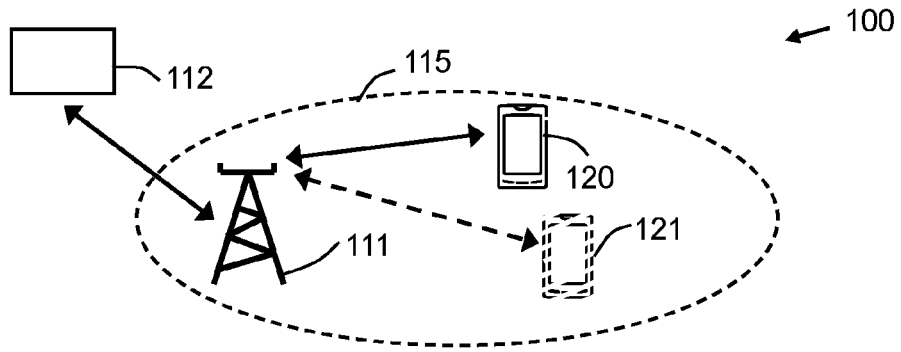
FIG. 1 is a block diagram schematically depicting an example of a wireless communication network in which embodiments herein may be implemented.

FIG. 1 depicts an example of a wireless communication network 100 in which embodiments herein may be implemented. The wireless communication network 100 may be an LTE, WCDMA, GSM network, any 3GPP cellular network, Wimax, or any cellular network or system.

The wireless communication network 100 comprises a plurality of network nodes whereof two, a first network node 111 and a second network node 112 are depicted in FIG. 1. The first network node 111 may be a transmission point such as a radio base station, for example an eNB, an eNodeB, or an Home Node B, an Home eNode B or any other network node capable to serve a user equipment or a machine type communication device in a wireless communication network. The second network node 112 may be a management node or controlling node of the first network node, e.g. an MME.

A first wireless device 120 is shown located in the wireless communication network 100. Wireless device may also be named user equipment or UE. There may also be one or more additional wireless devices, e.g. comprising a second wireless device 121, located in the wireless communication network 100. The first and second wireless devices 120 and 121 may respectively e.g. be a user equipment, a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communication network. Please note the term user equipment or UE used in this document also covers other wireless devices such as Machine to machine (M2M) devices, even though they do not have any user.

The first network node 111 provides radio coverage in a cell 115 and is thereby able to serve one or more wireless devices, e.g. the first and second wireless devices 120, 121, located therein, which may be expressed as the first network node 111 serves the cell 115.

Figure 2:
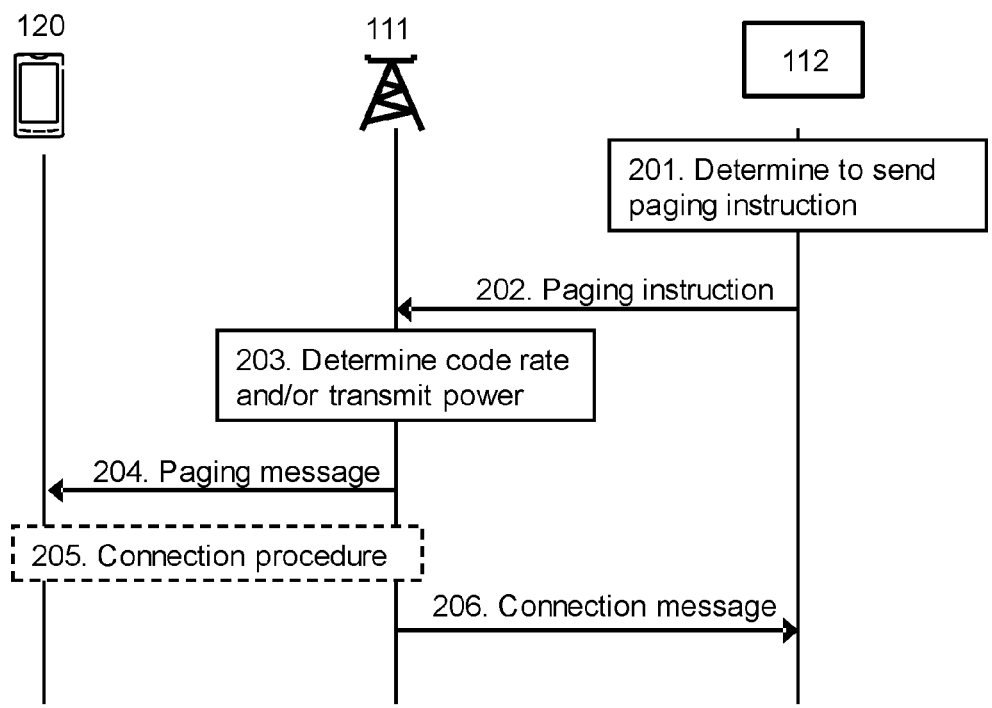
FIG. 2 is a combined signaling diagram and flowchart for describing embodiments herein.

Examples of embodiments herein relating to a method in, e.g. performed by, the first network node 111 and relating to a method in, e.g. performed by, the second network node 112, will now be described with reference to the combined signaling diagram and flowchart depicted in FIG. 2. Particularly will the examples relate to LTE. In the following, to facilitate understanding in the context of LTE, the first network node 111 may be an eNB, the second network node 112 may be an MME and the first wireless device 120 may be what typically is named UE. The actions may be taken in any suitable order.

Action 201

The second network node 112 determines to send a paging instruction to the first wireless device 120. In LTE the determination can result from the second network node 112 determining to send the paging instruction to all eNBs, including e.g. the first network node 111, that belongs to a Tracking Area (TA) that is part of a TA list. The TA list may have only one entry but typically contains several TAs. The TA comprises the first network node 111 and typically also additional eNBs. The determination may e.g. be based on receipt by the first network node 111 of an indication sent from a Serving GateWay (S-GW) of the wireless communication network 100, which indication indicates that DL data has arrived for delivery to the first wireless device 120. Another example of what the determination may be based on is so called Circuit Switched (CS) fallback.

Further exemplifying details relating to certain parts of action 201 may be found, e.g., in 3GPP TS 24.301, "Non-Access-Stratum (NAS) protocol for Evolved Packet System (EPS); Stage 3", chapter 5.6.2, v.11.6.0.

Action 202

The second network node 112 sends the paging instruction to the first network node 111. The eNB may receive the paging instruction. The paging instruction may be sent over a S1-AP interface and in the form of a S1-AP message. The paging instruction may be named a S1-AP paging message. When the second network node 112 sends the paging instruction, it may also start a timer that may be named T3413. This timer is typically in the order of a few seconds. If the second network node 112 has not been notified that the first wireless device 120 has connected to the network before the expiration of the timer, the second network node 112 may try again, i.e. send yet another paging instruction. This may also be expressed as if the second network node 112 does not get a NAS response from the first wireless device 120 after the expiration of the timer, it may assume that the sent paging instruction did not have intended effect, e.g. that it was lost on the way or that the first network node 111 in turn did not succeed to page the first wireless device 120. The second network node 112 may then send yet another paging instruction, i.e. a sequence of paging instructions may be sent until the first wireless device 120 "wakes" from idle mode and connects.

Further exemplifying details relating to the certain parts of action 202 in the case of LTE may be found, e.g., in 3GPP TS 36.413, v.10.6.0, chapter 8.5 and 9.1.6 and TS 24.301, "Non-Access-Stratum (NAS) protocol for Evolved Packet System (EPS);Stage 3", chapter 5.6.2.

In some embodiments the second network node 112 may add a sequence number in the paging instructions it sends, which number indicates where in the sequence a present paging message to be sent by the first network node 111 to the first wireless device 120. In LTE, a paging message sent by the first network node 111 to the first wireless device 120 may be referred to as a RRC paging message. Hence, according to embodiments herein, the MME may add a sequence number in the S1-AP message. The first sequence number may e.g. be 1 and for following re-transmissions e.g. 2,3, etc. The sequence number may be comprised in a field in the S1-AP paging message, i.e. in the paging instruction, which field may contain the sequence number that may indicate to the first network node 111 which page message in the sequence, e.g. [1, 2, . . . , maxNrOfPages], the present page message belongs. The field in the S1-AP paging message may e.g. be an additional information element added to the paging message, as defined, e.g., in 3GPP TS 36.413, ver. 10.6.0, "E-UTRAN;S1 Application Protocol (S1AP)", chapter 9.1.6.

Action 203

The first network node 111 determines a code rate and/or transmit power for the present paging message based on the location of the present paging message in the sequence of paging messages. Hence, the code rate for coding and/or the transmit power for transmitting the present paging message may thus be dependent on how many times the first wireless device 120 has been paged before the present paging message is to be sent. The first wireless device 120 is said to be paged when first network node 111 sends a paging message to the first wireless device 120.

Example code rates for PDSCH transmissions are defined, e.g., in 3GPP TS 36.213 "Physical layer procedures", v. 8.8.0, chapter 7.1.7. For PDCCH code rates the same definition may be used. In practice the PDSCH may be coded with a higher or lower code-rate, according to the 3GPP definition, based on the sequence number in the S1-AP paging message.

Hence, the present action, e.g. if applied to each paging message of the sequence of paging messages, may result in a variation of code-rates for the paging messages of the sequence and/or a variation of transmit power for transmitting the paging messages of the sequence.

In addition to varying the code-rate for the paging messages in the sequence, it may be advantageous to also, or alternatively, vary the DL transmit power used for sending the paging messages of the sequence.

For the PDCCH this may amount to the usage of less or more Control Channel Elements (CCEs) used to transmit a DL assignment that the first wireless device 120 may need in order to successfully decode the page. The variation of code-rate for PDCCH may thus result in a variation of CCEs being used. In practice, the variation may be between 8 and 4 CCEs, but it may also affect the power with which the CCEs are transmitted.

The first network node 111 may assume a code-rate and/or power level for PDSCH and/or PDCCH to use for each sequence number. The first transmission of a paging message in the sequence may use a rather high code-rate and/or low transmit power, while following re-transmissions may decrease the code-rate and/or increase the transmit power according to some scheme.

The code-rate of the transmissions of paging messages in the sequence may be based DL quality indicators, such CQI, of all or a subset of UEs located in the same cell as first wireless device 120 to be paged, and/or being associated with the same eNB and/or same TA as the first wireless device 120 to be paged. This could be used to set appropriate code-rate values, for example so that a more robust coding is used when the quality indicators indicate lower quality compared to when the quality indicators indicate higher quality.

A "slow outer-loop" function may be utilized. For example, the code-rate may be adaptively changed according to the number of needed retransmissions. For example, based on that a certain percentage, e.g. 90%, of all paging messages should reach targeted wireless devices after initial and first transmissions, i.e. not be more than 10% paging messages that have not succeeded.

Action 204

The first network node 111 transmits the present paging message that thus is targeted for receipt by the first wireless device 120. The transmission may be in a cell or cells that the first network node 111 serves. The present paging message is coded based on the determined code rate and/or transmitted based on the determined transmit power. The latter may be accomplished through power scaling to the determined transmit power. The coding of the present paging message may be accomplished through channel coding using the determined code rate and the power level of the present paging message may be accomplished through power scaling using the determined transmit power, e.g. a power level. For example, the first network node 111 may adapt the code-rate and/or transmit power used on PDSCH and/or PDCCH for sending the present paging message, based on the determined code rate and/or determined transmit power and/or sequence number. Channel coding may e.g. introduce extra bits that may be used for forward error correction.

The first network node 111 may use information in the paging instructions, e.g. S1-AP paging message, to create the present paging message, e.g. RRC paging message.

Further exemplifying details relating to some of the above parts of action 204 in the case of LTE may be found, e.g., in 3GPP TS 36.331, chapter 5.3.2.

It should be noted that an RRC paging message may comprise more than one paging record. Hence, more than the first wireless device 120, i.e. also additional wireless devices, may be addressed by the paging message, e.g. the present paging message, and in the same transmission. The paging records may have different sequence numbers associated with them. In such case the code-rate and/or power may be determined based on an average sequence number, or e.g. based on the highest sequence number of all paging records in the paging message. In any case, link adaptation of such combined paging message may still be based on information from the paging instruction and one or more additional paging instructions, e.g. based on sequence number(s) from S1-AP paging message(s). The first network node 111 may determine, e.g. by adapting, the code-rate and/or transmit power, e.g. as used on PDSCH and/or PDCCH, for transmitting the paging message based on one or more sequence numbers from one or more paging instructions.

Paging messages, e.g. RRC paging messages, from e.g. the first network node 111 to the first wireless device 120, may but need not be sent in response to a paging instruction, e.g. S1-AP paging message, from e.g. the second network node 112 to the first network node 111. The first network node 111 may e.g. send a paging message, e.g. RRC paging message, to the first wireless device 120 independent from the paging instruction such as S1-AP paging message. The paging message, e.g. RRC paging message may e.g. be transmitted in response to e.g. presence of ETWS (Earthquake and Tsunami Warning System) information, or the like, and/or in case of changes in System Information (SI) that require a reacquisition of SI by the first wireless device 120. Such information may be extra important to quickly deliver to all recipients. Therefore, in such cases, in particular in case of warning information, a more robust coding-rate and/or transmit power may be used initially than would otherwise be the case. In general it may be desirable that paging messages originating from the first network node 111, such as RRC originating paging messages, for which no sequence number is available, to use a different, e.g. more robust coding and/or higher transmit power, at least than a first paging message that is part of a sequence. In general, it may be desirable to prioritize certain paging messages and therefore be able to transmit such using code rates and/or transmit power that directly provides more robust transmission, i.e. with increased likelihood to reach as many wireless device as possible, and as soon as possible, than when transmitting at least an initial paging message or messages of a sequence as described herein.

Action 205

When/if the transmitted present paging message is received by the first wireless device 120 a connections procedure may be carried out between the first network node 111 and the first wireless device 120. In LTE this procedure may be referred to as Random Access Procedure that may end with a RRC Connection Setup Complete message being sent by the first wireless device 120 to the first network node 111.

Action 206

In response to that the connections procedure has ended, e.g. in response to receipt of the RRC Connection Setup Complete message, the first network node 111 may send a connection message to the second network node 112 informing about that the first wireless device 120 has connected to the wireless communication network. In LTE the connection message may be a S1-AP Initial UE message.

In many cases a page will be detected at the first attempt even if an initial or first paging message of a sequence is not sufficiently robust, e.g. not coded hard enough, and/or transmitted with sufficient transmit power, to e.g. reach a cell-edge. However, only a small amount of wireless devices typically experience cell-edge like conditions. Hence, a lot of physical resources, such as radio resources, resource blocks and the like, may be saved, i.e. available for use by other functions than the paging procedure, by not assuming that all wireless devices have cell-edge conditions when e.g. determining the code-rate for the initial or first paging message(s) in the sequence. Thanks to embodiments herein remaining wireless devices may instead be successfully paged by subsequent paging messages in the sequence, e.g. by using more robust code-rates and/or transmit power. Embodiments herein may be considered to result in paging messages being transmitted in a distributed manner in a cell with increased robustness in each transmission of the paging messages in the sequence. However, the increased robustness, and spending of resources for accomplishing this may now mainly concern wireless devices that may require this. Even though more re-transmissions may be required than else would be the case for some wireless devices, in total resources may still be saved and embodiments herein thus result in less waste of resources than else would be the case. Hence, embodiments herein enable that some resources, that would be used and occupied by a conventional paging procedure, need not be occupied, and instead may be available for other use.

Figure 3:
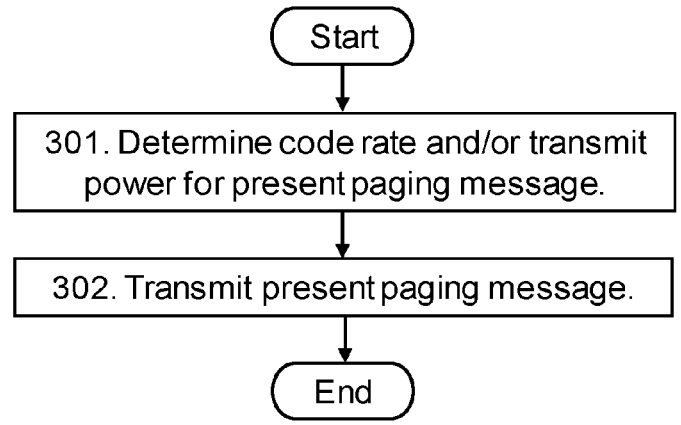
FIG. 3 is a flowchart schematically illustrating embodiments of a method performed in a first network node of the wireless communication network.

FIG. 3 is a flow chart schematically illustrating embodiments of a method, performed by the first network node 111 of the wireless communication network 100, for managing of paging of the wireless device 120. As used herein, paging refers to a procedure for making a wireless device, e.g. the wireless device 120, when in an idle mode, to connect or at least initiate connection to the wireless communication network 100. The method comprises the actions of:

Action 301

The first network node 111 determines a code rate and/or transmit power for a present paging message based on a location in a sequence of paging messages. The location is associated with the present paging message.

As an example, this may mean that the code rate used when coding the present paging message is dependent on, e.g. based on, how many times the wireless device 120 may have been unsuccessfully paged before the present paging message, which is to be transmitted next. The wireless device 120 is said to be paged when the first network node 111 sends a paging message to the wireless device 120. The paging message sent to the wireless device 120 typically comprises an identity of the wireless device and an indicator indicating that it is a paging message. For example, the paging message may e.g. comprise a Core Network (CN) identity of the wireless device 120, such as a System Architecture Evolution (SAE) Temporary Mobile Subscriber Identity (TMSI), aka S-TMSI.

In some embodiments, the code rate for the present paging message is determined to be more robust, e.g. lower, than for a preceding paging message in the sequence and/or less robust, e.g. higher, than for a subsequent paging message in the sequence. Note that whether a code rate that is higher is more robust than a code rate that is lower, is dependent on how the code rate is defined in a particular case. A more robust code rate may be such code rate that compared to a less robust code rate increases the likelihood of successful paging but to the cost of more resources being required to accomplish this.

In some embodiments, the transmit power for the present paging message is determined to be more robust than for a preceding paging message in the sequence and/or less robust than for a subsequent paging message in the sequence.

In some embodiments, the first network node serves the cell 115 in which the wireless device 120 is located and the present paging message is transmitted in said cell 115. The code rate may be further based on an average downlink quality experienced by wireless devices, such as the wireless devices 120, 121, located in the cell 115. The experienced downlink quality may be based on downlink quality measurements performed by the wireless devices, and e.g. correspond to Channel Quality Indicator (CQI) values, and/or may be based on the last successful communication the first network node 111 had with respective wireless device. The latter may e.g. be accomplished by making the first network node remember a wireless device, e.g. the wireless device 120, at least for a while after the wireless device 120 enters an idle mode or sleep mode. In LTE this may e.g. be based on the S-TMSI of the wireless device 120.

Further, the code rate and/or transmit power may be determined based on an amount of wireless devices, e.g. including the wireless devices 120, 121, located in the cell and that did not connect in response to sending of one or more previously sent paging messages. The previously sent paging messages are associated with a preceding paging message or paging messages in the sequence.

This action may fully or partly correspond to actions 202-203 discussed above and which are exemplified particularly in the context of LTE.

Action 302

The first network node 111 transmits the present paging message that is targeted for receipt by the wireless device 120. The present paging message commands the wireless device 120 to connect, or at least initiate connection, to the wireless communication network 100. The present paging message is coded based on the determined code rate and/or transmitted based on the determined transmit power.

That the present paging message is coded based on the determined code rate may refer to channel coding using the determined code rate, which channel coding relates to a channel used for the transmission.

The present paging message may command the wireless device 120 explicitly but typically commands implicitly, where e.g. the wireless device 120 has been configured with a predetermined behavior triggered by receipt of the paging message.

This action may fully or partly correspond to action 204 discussed below and exemplified in the context of LTE.

In some embodiments, the determination and/or transmission of actions 301 and/or 302 are performed in response to receipt of a paging instruction from the second network node 112. Receipt of the paging instruction may fully or partly correspond to action 201 discussed below and exemplified in the context of LTE. The paging instruction may comprises a sequence number indicating where in the sequence the present paging message belongs. In such cases the determination of the code rate may be based on this sequence number.

Figure 4:
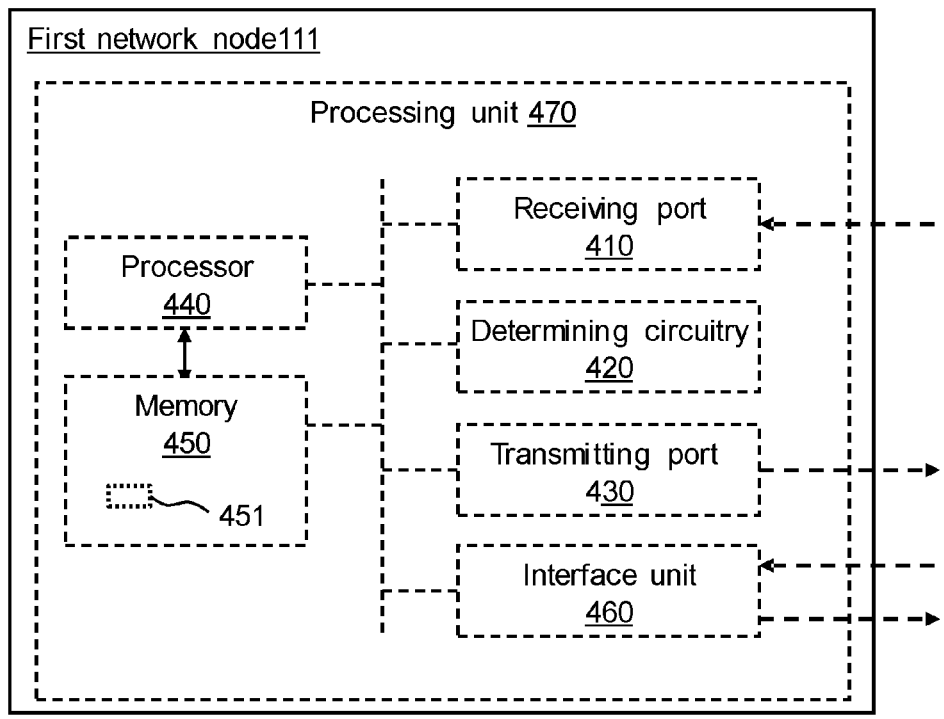
FIG. 4 is a functional block diagram for illustrating embodiments of the first network node and how the first network node may be configured to perform method actions.

FIG. 4 is a schematic block diagram for illustrating embodiments of the first network node 111 for managing of paging of the wireless device 120, and how the first network node 111 may be configured to perform the method actions discussed above in connection with FIG. 3.

Hence, the embodiments herein may be implemented through one or more processors, such as a processor 440 in the first network node 111 depicted in FIG. 4, together with computer program code for performing the functions and actions of the embodiments herein.

The first network node 111 may further comprise a memory 550 comprising one or more memory units. The memory 550 is arranged to be used e.g. to store obtained information, store data, configurations, schedulings, and applications etc. to perform the methods herein when being executed in the first network node 111. For example the memory 550 may comprise, such as contain or store, a computer program 451. The computer program comprises the computer program code or 'instructions' or 'code' directly or indirectly executable by the first network node 111, e.g. by the processor 540 thereof, so that the first network node 111 performs the method.

The first network node 111 may comprise one or more of a receiving port 410, a determining circuitry 520 and a sending port 530 as exemplifying hardware and/or software module(s). Further, the first network node 111 may comprise an interface unit 460 to facilitate communication between the first network node 111 and other nodes or devices, e.g. the wireless devices 120. 121. The interface unit 460 may, for example, include a transceiver configured to transmit and receive radio signals over an air interface in accordance with a suitable standard. Hence, the interface unit 460 may fully or partly replace and be configured to perform as the receiving port 410 and the transmitting port 430.

Those skilled in the art will also appreciate that the port(s) and/or circuit(s) described above may refer to a combination of analog and digital circuits, and/or one or more processors configured with software and/or firmware, e.g. stored in the memory, that when executed by the one or more processors, such as the processor 540 in the first network node 111, perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

In some examples, the first network node 111 may comprise a processing unit 560, which may comprise one or more of the circuit(s) and/or port(s) mentioned above.

Hence, the first network node 111 and/or the processing unit 470 and/or the determining circuitry 420 are operative, or configured, to determine the code rate and/or the transmit power for the present paging message based on said location in the sequence of paging messages, which location is associated with the present paging message.

Further, the first network node 111 and/or the processing unit 470 and/or the transmitting port 430 and/or the interface unit 460, are operative, or configured, to transmit the present paging message targeted for receipt by the wireless device 120. The present paging message, as already mentioned above, commands the wireless device 120 to connect, or at least initiate connection, to the wireless communication network 100. The present paging message is coded based on the determined code rate and/or is transmitted based on the determined transmit power.

FIGS. 5*a-c* are schematic drawings illustrating embodiments relating to the computer program 451 that comprises the computer program code that when executed by one or more processors, such as the processor 440, causes the first network node 111 to perform the method as described above.

The computer program 451 and computer program code mentioned above may be provided as a computer program product, for instance in the form of, or comprising, a data carrier carrying the computer program 451 and/or the computer program code for performing the embodiments herein when being loaded into the in the first network node 111, e.g. the processor 440 and/or memory 450. By data carrier may be excluded a transitory, propagating signal and the data carrier may correspondingly be named non-transitory computer readable medium.

Non-limiting examples of the data carrier is a memory card or a memory stick 501 as in FIG. 5*a*, a disc storage medium 502 such as a CD ROM disc or DVD as in FIG. 5*b*, a mass storage device 503 as in FIG. 5*c*. The mass storage device 503 is typically based on hard drive(s) or Solid State Drive(s) (SSD). The mass storage device 503 may be such that is used for storing data accessible over a computer network 504, e.g. the Internet or a Local Area Network (LAN).

The computer program 451 may furthermore be provided as pure computer program code and/or comprised in a file or files. The file or files may be stored on the computer-readable medium and e.g. available through download e.g. over the computer network 504, such as from the mass storage device 503 via a server. The server may e.g. be a web or file transfer protocol (ftp) server. The file or files may e.g. be executable files for direct or indirect download so that it may be executed after download in the first network node 111, e.g. by the processor 440, or may be for intermediate download and compilation involving the same or another processor to make them executable before further download and execution causing the first network node 111 to perform the method as described above.

FIG. 6 is a flow chart schematically illustrating embodiments of a method, performed by the second network node 112 of the wireless communication network 100, for managing of paging of the wireless device 120. The method comprises the actions of:

Action 601

The second network node 112 determines to page the wireless device 120 e.g. in an attempt to make the wireless device connect or at least initiate connection to the wireless communication network. Hence, said determination to page may be in response to that it has been determined to make the wireless device 120 connect to the wireless communication network 100.

This action may fully or partly correspond to action 201 discussed above and exemplified in the context of LTE.

Action 602

The second network node 112 sends, in response to the determination, a paging instruction to the first network node 111. The paging instruction commands the first network node 111 to perform actions as discussed above in connection with e.g. FIG. 3. Hence, the paging instruction commands the first network node 111 to:

Determine the code rate and/or the transmit power for the present paging message based on the location in the sequence of paging messages, which location is associated with the present paging message.

Transmit the present paging message targeted for receipt by the wireless device 120, which present paging message commands the wireless device 120 to connect, or at least initiate connection, to the wireless communication network 100. As already mentioned above, the present paging message is coded based on the determined code rate and/or is transmitted based on the determined transmit power.

The paging instruction may be the paging instruction discussed above in connection with FIG. 3.

This action may fully or partly correspond to action 202 discussed below and exemplified in the context of LTE.

Figure 7:
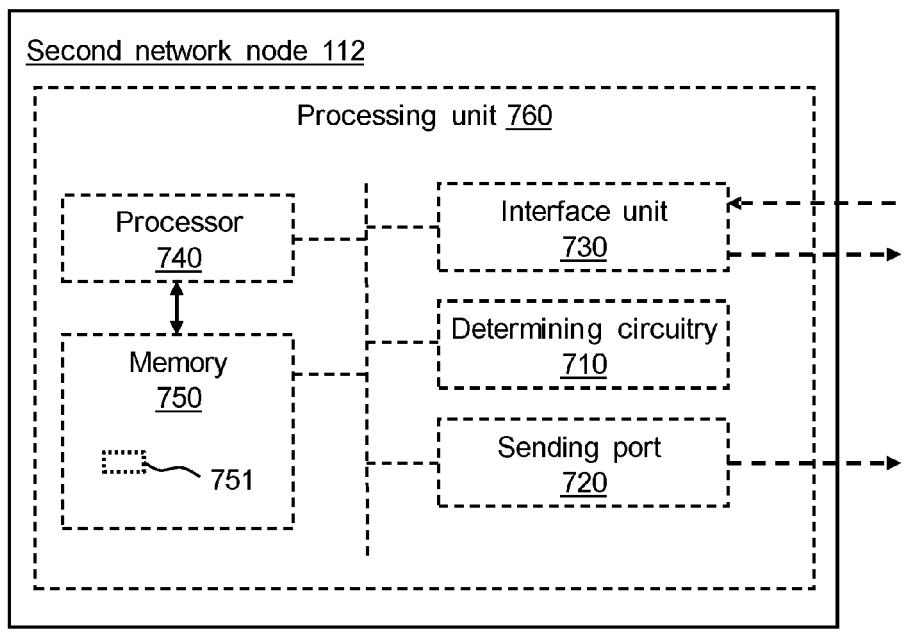
FIG. 7 is a functional block diagram for illustrating embodiments of the second network node and how the second network node may be configured to perform method actions.

FIG. 7 is a schematic block diagram for illustrating embodiments of the second network node 112 for managing of paging of the wireless device 120, and how the second network node 112 may be configured to perform the method actions discussed above in connection with FIG. 6.

Hence, the embodiments herein may be implemented through one or more processors, such as a processor 740 in the second network node 112 depicted in FIG. 7, together with computer program code for performing the functions and actions of the embodiments herein.

The second network node 112 may further comprise a memory 750 comprising one or more memory units. The memory 750 is arranged to be used to e.g. store obtained information, store data, configurations, schedulings, and applications etc. to perform the methods herein when being executed in the second network node 112. For example the memory 750 may comprise, such as contain or store, a computer program 751. The computer program 751 comprises the computer program code or 'instructions' or 'code' directly or indirectly executable by the second network node 112, e.g. by the processor 740 thereof, so that the second network node 112 performs the method.

The second network node 112 may comprise one or more of a determining circuitry 710 and a sending port 720 as exemplifying hardware and/or software module(s). Further, the second network node 112 may comprise an interface unit 730 to facilitate communication between the second network node 112 and other nodes or devices, e.g. the first network node 111. The interface unit 730 may, for example, include a transceiver configured to transmit and receive over a wired or wireless interface in accordance with a suitable standard. Hence, the interface unit 730 may fully or partly replace and be configured to perform as the sending port 720.

Those skilled in the art will also appreciate that the port(s) and/or circuit(s) described above may refer to a combination of analog and digital circuits, and/or one or more processors configured with software and/or firmware, e.g. stored in the memory, that when executed by the one or more processors, such as the processor 740 in the second network node 112, perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

In some examples, the second network node 112 may comprise a processing unit 760, which may comprise one or more of the circuit(s) and/or port(s) mentioned above.

Hence, the second network node 112 and/or the processing unit 760 and/or the determining circuitry 710 and/or the interface unit 740, are operative, or configured, to determine to page the wireless device 120.

Further, the second network node 112 and/or the processing unit 760 and/or the sending port 720 and/or determining circuitry 710, are operative, or configured, to send, in response to the determination, the paging instruction to the first network node 111. The paging instruction commands the first network node 111 to perform actions as discussed above under action 602.

Figure 8A:
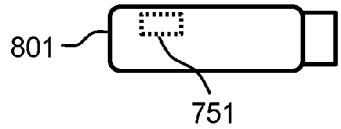
FIGS. 8a-c are schematic drawings illustrating embodiments relating to a computer program product and computer program to cause the second network node to perform method actions.
Figure 8B:
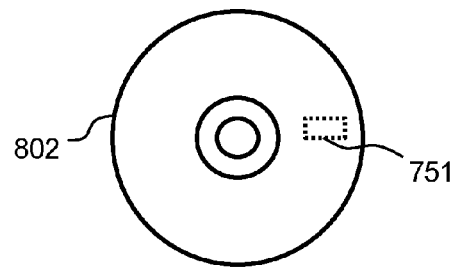
Figure 8C:
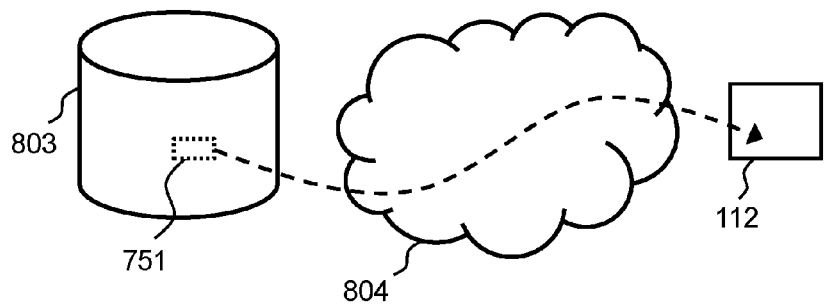

FIGS. 8*a*-*c* are schematic drawings illustrating embodiments relating to the computer program 751 that comprises the computer program code that when executed by one or more processors, such as the processor 740, causes the second network node 112 to perform the method as described above.

The computer program 751 and computer program code mentioned above may be provided as a computer program product, for instance in the form of, or comprising, a data carrier carrying the computer program 751 and/or the computer program code for performing the embodiments herein when being loaded into the second network node 112, e.g. the processor 740 and/or memory 750. By data carrier may be excluded a transitory, propagating signal and the data carrier may correspondingly be named non-transitory computer readable medium.

Non-limiting examples of the data carrier is a memory card or a memory stick 801 as in FIG. 8*a*, a disc storage medium 802 such as a CD ROM disc or DVD as in FIG. 8*b*, a mass storage device 803 as in FIG. 8*c*. The mass storage device 803 is typically based on hard drive(s) or Solid State Drive(s) (SSD). The mass storage device 803 may be such that is used for storing data accessible over a computer network 804, e.g. the Internet or a Local Area Network (LAN).

The computer program 751 may furthermore be provided as pure computer program code and/or comprised in a file or files. The file or files may be stored on the computer-readable medium and e.g. available through download e.g. over the computer network 804, such as from the mass storage device 803 via a server. The server may e.g. be a web or file transfer protocol (ftp) server. The file or files may e.g. be executable files for direct or indirect download so that it may be executed after download in the second network node 112, e.g. by the processor 740, or may be for intermediate download and compilation involving the same or another processor to make them executable before further download and execution causing the second network node 112 to perform the method as described above.

As used herein, the term "processing unit" may relate to a processing circuit, a processor, an application specific integrated circuit (ASIC), a field-programmable gate array (FPGA) or the like. As an example, a processor, an ASIC, an FPGA or the like may comprise one or more processor kernels. In some examples, the processing circuit may be embodied by a software and/or hardware module. Any such module may be a determining means, estimating means, capturing means, associating means, comparing means, identification means, selecting means, receiving means, transmitting means or the like as disclosed herein. As an example, the expression "means" may be a unit, such as a determining unit, selecting unit, etc.

Radio network node: In some embodiments the non-limiting term radio network node is more commonly used and it may as such refer to any type of network node serving UE and/or connected to other network node or network element or any radio node from where UE receives signal. Examples of radio network nodes are Node B, base station (BS), multi-standard radio (MSR) radio node such as MSR BS, eNode B, eNB, network controller, radio network controller (RNC), base station controller, relay, donor node controlling relay, base transceiver station (BTS), access point (AP), transmission points, transmission nodes, RRU, RRH, nodes in distributed antenna system (DAS) etc.

Network node: In some embodiments a more general term "network node" is used and it may correspond to any type of radio network node or any network node, which communicates with at least a radio network node. Examples of network node are any radio network node stated above, core network node (e.g. MSC, MME etc), O&M, OSS, Self Organizing Network (SON), positioning node (e.g. E-SMLC), MDT etc.

When the term "the network" is used in isolation herein it refers to the wireless communication network or one or more network nodes thereof.

User equipment: In some embodiments the non-limiting term user equipment (UE) is used and it refers to any type of wireless device communicating with a radio network node in the wireless communication network. Examples of UE are target device, device to device UE, machine type UE or UE capable of machine to machine communication, PDA, tablet, mobile terminal, smart phone, laptop embedded equipped (LEE), laptop mounted equipment (LME), USB dongles etc.

The embodiments herein also applies to multi-point carrier aggregation systems.

Note that although terminology from 3GPP LTE has been used in this disclosure to exemplify embodiments herein, this should not be seen as limiting the scope of the embodiments herein to only the aforementioned system. Other wireless systems, including WCDMA, WiMax, UMB and GSM, may also benefit from exploiting the ideas covered within this disclosure.

Also note that terminology such as eNB, UE, first network node, second network node etc. should be considering non-limiting and does not per se imply a certain hierarchical relation there between.

It should be noted that embodiments herein are not necessarily mutually exclusive. Components from one embodiment may be tacitly assumed to be present in another embodiment and it will be obvious to a person skilled in the art how those components may be used in the other exemplary embodiments.

Embodiments herein may be implemented within a LTE RAN and core network and may involve an eNB corresponding to the first network node 111 interacting with an MME corresponding to the second network node 112 and a UE corresponding to the wireless device 120. Embodiments herein may thus be specifically implemented within a MME and/or eNB. An UE, e.g. the wireless device 120, may benefit from the embodiments herein indirectly.

As used herein, the term "memory" may refer to a non-transitory memory media such as a hard disk, a magnetic storage medium, a portable computer diskette or disc, flash memory, random access memory (RAM) or the like. Furthermore, the memory may be an internal register memory of a processor.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the present specification.

The invention claimed is:

1. A method, performed by a first network node of a wireless communication network, for managing of paging of a wireless device, wherein the method comprises:
    determining a code rate and/or transmit power for a present paging message based on a location in a sequence of paging messages, which location is associated with the present paging message; and
    transmitting the present paging message targeted for receipt by the wireless device, according to the determined code rate and/or determined transmit power, wherein the present paging message commands the wireless device to connect, or at least initiate connection, to the wireless communication network.

2. The method as claimed in claim 1, wherein the determined code rate is a determined channel coding rate, relating to a channel used for transmitting the present paging message.

3. The method as claimed in claim 1, wherein the determination and/or transmission are performed in response to receipt of a paging instruction from a second network node.

4. The method as claimed in claim 3, wherein the paging instruction comprises a sequence number indicating where in the sequence the present paging message belongs.

5. The method as claimed in claim 1, wherein the present paging message is one in said sequence of paging messages and wherein determining the code rate comprises using a more robust code rate for the present paging message in comparison to the code rate used for a preceding paging message in said sequence, or using a less robust code rate for the present paging message in comparison to the code rate used for a succeeding paging message in said sequence.

6. The method as claimed in claim 1, wherein the present paging message is one in said sequence of paging messages and wherein determining the transmit power comprises using a higher transmit power for the present paging message in comparison to the transmit power used for a preceding paging message in said sequence, or using a lower transmit power for the present paging message in comparison to the transmit power used for a succeeding paging message in said sequence.

7. The method as claimed in claim 1, wherein the first network node serves a cell in which the wireless device is located and the present paging message is transmitted in said cell.

8. The method as claimed in claim 7, wherein the code rate is further based on an average downlink quality experienced by wireless devices located in the cell.

9. The method as claimed in claim 7, wherein the code rate and/or transmit power is determined based on the number of wireless devices that are located in the cell and that did not connect in response to sending of one or more previously sent paging messages.

10. A non-transitory computer-readable medium storing a computer program comprising program instructions that, when executed by processing circuitry of a first network node of a wireless communication network, configures the first network node for managing of paging of a wireless device, said computer program comprising program instructions configuring the first network node to:
determine a code rate and/or transmit power for a present paging message based on a location in a sequence of paging messages, which location is associated with the present paging message; and
transmit the present paging message targeted for receipt by the wireless device, according to the determined code rate and/or determined transmit power, wherein the present paging message commands the wireless device to connect, or at least initiate connection, to the wireless communication network.

11. A method, performed by a second network node of a wireless communication network, for managing of paging of a wireless device, wherein the method comprises:
determining to page the wireless device,
sending, in response to the determination, a paging instruction to a first network node of the wireless communication network, wherein the paging instruction commands the first network node to:
determine a code rate and/or transmit power for a present paging message based on a location in a sequence of paging messages, which location is associated with the present paging message, and
transmit the present paging message targeted for receipt by the wireless device, according to the determined code rate and/or transmit power, which present paging message commands the wireless device to connect, or at least initiate connection, to the wireless communication network.

12. The method as claimed in claim 11, wherein the present paging message being coded refers to channel coding using the determined code rate, which channel coding relates to a channel used for transmitting the present paging message.

13. The method as claimed in claim 11, wherein the determination and/or transmission are performed in response to receipt of a paging instruction from a second network node.

14. The method as claimed in claim 13, wherein the paging instruction comprises a sequence number indicating where in said sequence of paging messages the present paging message belongs.

15. The method as claimed in claim 11, wherein the present paging message is one in said sequence of paging messages and wherein the code rate is determined such that the first network node uses a more robust code rate for the present paging message in comparison to the code rate used for a preceding paging message in said sequence, or uses a less robust code rate for the present paging message in comparison to the code rate used for a succeeding paging message in said sequence.

16. The method as claimed in claim 11, wherein the present paging message is one in said sequence of paging messages and wherein the transmit power is determined such that the first network node uses a higher transmit power for the present paging message in comparison to the transmit power used for a preceding paging message in said sequence, or uses a lower transmit power for the present paging message in comparison to the transmit power used for a succeeding paging message in said sequence.

17. The method as claimed in claim 11, wherein the first network node serves a cell in which the wireless device is located and the present paging message is transmitted in said cell.

18. The method as claimed in claim 17, wherein the code rate is further based on an average downlink quality experienced by wireless devices located in the cell.

19. The method as claimed in claim 17, wherein the code rate and/or transmit power is determined based on the number of wireless devices that are located in the cell and that did not connect in response to sending of one or more previously sent paging messages.

20. A non-transitory computer-readable medium storing a computer program comprising program instructions that, when executed by processing circuitry in a second network node in a wireless communication network, configure the second network node for managing of paging of a wireless device, said computer program comprising program instructions configuring the second network node to:
determine to page the wireless device; and
send, in response to the determination, a paging instruction to a first network node of the wireless communication network, wherein the paging instruction commands the first network node to:
determine a code rate and/or transmit power for a present paging message based on a location in a sequence of paging messages, which location is associated with the present paging message, and transmit the present paging message targeted for receipt by the wireless device, according to the determined code rate and/or transmit power, which present paging message commands the wireless device to connect, or at least initiate connection, to the wireless communication network.

21. A first network node for managing of paging of a wireless device, which first network node is comprised in a wireless communication network and comprising:

communication circuitry configured for transmitting paging messages;

processing circuitry configured to:

determine a code rate and/or transmit power for a present paging message based on a location in a sequence of paging messages, which location is associated with the present paging message, and transmit, via the communication circuitry, the present paging message targeted for receipt by the wireless device, according to the determined code rate and/or transmit power, which present paging message commands the wireless device to connect, or at least initiate connection, to the wireless communication network.

22. The first network node as claimed in claim 21, wherein the paging message is channel coded using the determined code rate, which channel coding relates to a channel used for transmitting the present paging message.

23. The first network node as claimed in claim 21, wherein the determination and/or transmission are performed in response to receipt of a paging instruction from a second network node.

24. The first network node as claimed in claim 23, wherein the paging instruction comprises a sequence number indicating where in the sequence the present paging message belongs.

25. The first network node as claimed in claim 21, wherein the present paging message is one in said sequence of paging messages and wherein the code rate is determined such that the first network node uses a more robust code rate for the present paging message in comparison to the code rate used for a preceding paging message in said sequence, or uses a less robust code rate for the present paging message in comparison to the code rate used for a succeeding paging message in said sequence.

26. The first network node as claimed in claim 21, wherein the present paging message is one in said sequence of paging messages and wherein the transmit power is determined such that the first network node uses a higher transmit power for the present paging message in comparison to the transmit power used for a preceding paging message in said sequence, or uses a lower transmit power for the present paging message in comparison to the transmit power used for a succeeding paging message in said sequence.

27. The first network node as claimed in claim 21, wherein the first network node serves a cell in which the wireless device is located and the present paging message is transmitted in said cell.

28. The first network node as claimed in claim 27, wherein the code rate is further based on an average downlink quality experienced by wireless devices located in the cell.

29. The first network node as claimed in claim 27, wherein the code rate and/or transmit power is determined based on the number of wireless devices that are located in the cell and that did not connect in response to sending of one or more previously sent paging messages.

30. A second network node for managing of paging of a wireless device, wherein the second network node is comprised in a wireless communication network and comprises:

communication circuitry configured for communicating with a first network node of the wireless communication network; and processing circuitry configured to:

determine to page the wireless device; and send, in response to the determination, a paging instruction to the first network node, wherein the paging instruction commands the first network node to:

determine a code rate and/or transmit power for a present paging message based on a location in a sequence of paging messages, which location is associated with the present paging message, and transmit the present paging message targeted for receipt by the wireless device, which present paging message commands the wireless device to connect, or at least initiate connection, to the wireless communication network, wherein the present paging message is being coded based on the determined code rate and/or being transmitted based on the determined transmit power.

31. The second network node as claimed in claim 30, wherein the present paging message being coded refers to channel coding using the determined code rate, which channel coding relates to a channel used for transmitting the present paging message.

32. The second network node as claimed in claim 30, wherein the determination and/or transmission are performed in response to receipt of a paging instruction from a second network node.

33. The second network node as claimed in claim 32, wherein the paging instruction comprises a sequence number indicating where in the sequence the present paging message belongs.

34. The second network node as claimed in claim 30, wherein the present paging message is one in said sequence of paging messages and wherein the code rate is determined such that the first network node uses a more robust code rate for the present paging message in comparison to the code rate used for a preceding paging message in said sequence, or uses a less robust code rate for the present paging message in comparison to the code rate used for a succeeding paging message in said sequence.

35. The second network node as claimed in claim 30, wherein the present paging message is one in said sequence of paging messages and wherein the transmit power is determined such that the first network node uses a higher transmit power for the present paging message in comparison to the transmit power used for a preceding paging message in said sequence, or uses a lower transmit power for the present paging message in comparison to the transmit power used for a succeeding paging message in said sequence.

36. The second network node as claimed in claim 30, wherein the first network node serves a cell in which the wireless device is located and the present paging message is transmitted in said cell.

37. The second network node as claimed in claim 36, wherein the code rate is further based on an average downlink quality experienced by wireless devices located in the cell.

38. The second network node as claimed in claim 36, wherein the code rate and/or transmit power is determined based on the number of wireless devices that are located in the cell and that did not connect in response to sending of one or more previously sent paging messages.

\* \* \* \* \*